United States Patent
Mritunjai

(10) Patent No.: US 11,556,589 B1
(45) Date of Patent: Jan. 17, 2023

(54) ADAPTIVE TIERING FOR DATABASE DATA OF A REPLICA GROUP

(71) Applicant: Amazon Technologies, Inc., Seattle, WA (US)

(72) Inventor: Akhilesh Mritunjai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 17/037,528

(22) Filed: Sep. 29, 2020

(51) Int. Cl.
*G06F 16/901* (2019.01)
*H04L 67/104* (2022.01)
*G06F 16/9035* (2019.01)
*G06F 16/21* (2019.01)
*G06F 16/27* (2019.01)

(52) U.S. Cl.
CPC ........ *G06F 16/9027* (2019.01); *G06F 16/214* (2019.01); *G06F 16/278* (2019.01); *G06F 16/9035* (2019.01); *H04L 67/1051* (2013.01)

(58) Field of Classification Search
CPC .. G06F 16/9027; G06F 16/214; G06F 16/278; G06F 16/9035; H04L 67/1051; H04L 41/12; H04L 67/10; H04L 67/1095; H04L 67/1097; H04L 67/01
See application file for complete search history.

(56) References Cited

U.S. PATENT DOCUMENTS

| | | | |
|---|---|---|---|
| 9,213,716 B2 | 12/2015 | Schreter et al. | |
| 9,218,142 B2 | 12/2015 | Hamedani et al. | |
| 9,262,458 B2 | 2/2016 | Schreter | |
| 2014/0006411 A1* | 1/2014 | Boldyrev | G06F 16/29 707/741 |
| 2015/0074222 A1* | 3/2015 | Liang | G06F 9/5083 709/214 |
| 2015/0112951 A1* | 4/2015 | Narayanamurthy | G06F 16/172 707/694 |
| 2017/0039239 A1* | 2/2017 | Saadat-Panah | H04L 67/1097 |
| 2017/0364273 A1* | 12/2017 | Schreter | G06F 16/27 |
| 2019/0347352 A1* | 11/2019 | Gochkov | H04L 67/1002 |
| 2020/0125272 A1* | 4/2020 | Greco | G06F 3/0634 |

\* cited by examiner

*Primary Examiner* — William B Partridge
*Assistant Examiner* — Lana Alagic
(74) *Attorney, Agent, or Firm* — Robert C. Kowert; Kowert, Hood, Munyon, Rankin & Goetzel, P.C.

(57) ABSTRACT

A storage node of a database replica group may distribute different portions of data in local storage and external storage, where local storage and external storage are organized using different types of index structures. Responsive to receiving an access request for a database, a storage node may determine that an item of the database to be accessed by the request does not reside within a first portion of the database stored locally at the storage node. Responsive to this determination, the storage node may obtain from an external storage service a second portion of the database, the second portion including a plurality of items including the item, and the second portion organized according to a structure different from the first portion. The storage node may then store the plurality of obtained items in the first portion and process the request using the first portion of the database.

20 Claims, 10 Drawing Sheets

ADAPTIVE TIERING FOR DATABASE DATA OF A REPLICA GROUP

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data to cope with the increasing demand upon data storage resources and to provide highly performant access to dynamically changing access demands.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

The techniques described herein may implement adaptive tiering of database data for a replica group. Replica groups may be implemented for databases in various embodiments to provide resilience, durability, and additional request processing capacity (e.g., additional read requests) for a database in a database system. The benefits provided by replica groups are not without costs. For instance, high-performance database systems may rely upon special storage hardware (e.g., SSDs, non-volatile memory, etc.) to provide quick access to database data. While some copies of database data may be used for responding to requests, some copies that are used to increase durability and resiliency to failure may be hosted in the same costly storage technology. Thus, techniques that reduce the costs of providing durability and resiliency without decreasing performance if or when the copy is utilized for accessing the database are thus highly desirable.

Figure 1:
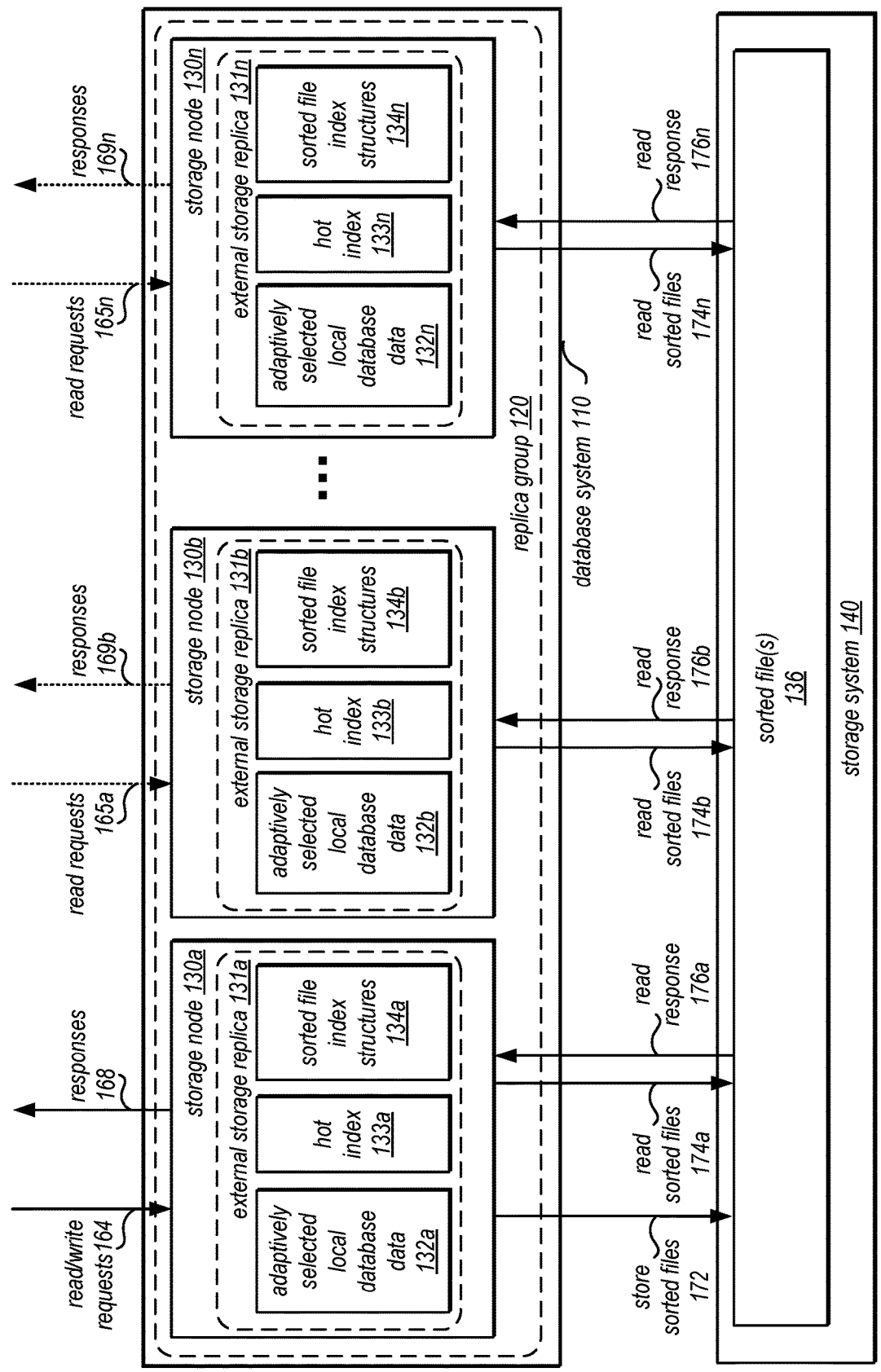
FIG. 1 is a logical block diagram illustrating adaptive tiering for database data of a replica group, according to some embodiments.

FIG. 1 is a logical block diagram illustrating adaptive tiering for database data of a replica group, according to some embodiments. Database system 110 may be one of various types of databases (e.g., relational, non-relation, NoSQL, document, etc.), in some embodiments. Database system 110 may implement replica group 120 which may include multiple storage nodes, such as storage nodes 130, in various embodiments. In some scenarios, replica group 120 may be only a single node (e.g., in failure modes, degraded modes, or different performance modes (not illustrated)). In some embodiments, one of the storage nodes, such as storage node 130a, may function as a first storage node implementing an external storage replica 131a. Storage node 130a may accept both read and write access requests 164 for the database and return responses 168 to those requests. In various embodiments, storage node 130a may store local database data 132a to perform the write accesses and perform reads of data.

In some embodiments, storage nodes 130 other than the first storage node 130a may optionally perform read requests. For example read requests 165 may be received at a storage node 130 and responses 169 to those requests returned by the storage nodes 130. Storage nodes 130 may also create sorted file index structures 134, which may, in some embodiments, include probabilistic structures, such as bloom filters or skip lists, or other non-probabilistic structures to determine which sorted files to read when storing sorted files 136. Thus storage nodes 130 may access the sorted file index structures 134 to determine which sorted files to read to return a response, as discussed below with regard to FIG. 7. In some embodiments, storage nodes 130 may also implement hot indexes 133 identifying portions of database data 132 which may be accessed more frequently or are more likely to be accessed than other portions of the database partition.

As also discussed below with regard to FIG. 7, in some embodiments, adaptively selected local database data 132 may be used by database system 110 to adaptively identify some items to store locally so that they may be cached (e.g., in memory or other local storage at storage nodes 130), as discussed in detail below with regard to FIG. 8. For example, per-item access patterns may be tracked, monitored, or otherwise evaluated in order to determine whether items should be maintained locally in addition to a remote storage location, like storage system 140. In this way, local database data 132 can be used to answer read requests. The items to maintain locally may be mirrored, copied, or otherwise replicated across replica groups in some embodiments. In some embodiments, local database data 132 may differ among the individual storage nodes 130 (e.g., in scenarios where individual storage nodes 130 may each serve read requests resulting in different items being stored locally as a result of those requests). In some embodiments, other types of caching strategies, such as cold caches for point queries, may be implemented in addition to or instead of hot data caches. In various embodiments, local database data 132 may be organized in using any suitable indexing structure such as log-structured merge trees or balanced trees.

In some embodiments, storage system 140 may be a file-based, object-based, or other type of storage system that may be used to store sorted files 136 for external storage replica group members as discussed below with regard to FIGS. 3 and 4. Storage system 140 may implement striping, sharding, or other data distribution techniques so that different portions of a file 136 are stored across multiple locations (e.g., at separate nodes) allowing for parallel reads to perform various operations such as read request handling and new replica creation, as discussed below with regard to FIGS. 3-6.

This specification begins with a general description of a provider network that may implement a database service that may employ different types of index structures for storing database data in a replica group. Then various examples of a database service are discussed, including different components/modules, or arrangements of components/module, that may be employed as part of implementing the database service, in some embodiments. A number of different methods and techniques to implement different types of index structures for storing database data in a replica group are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
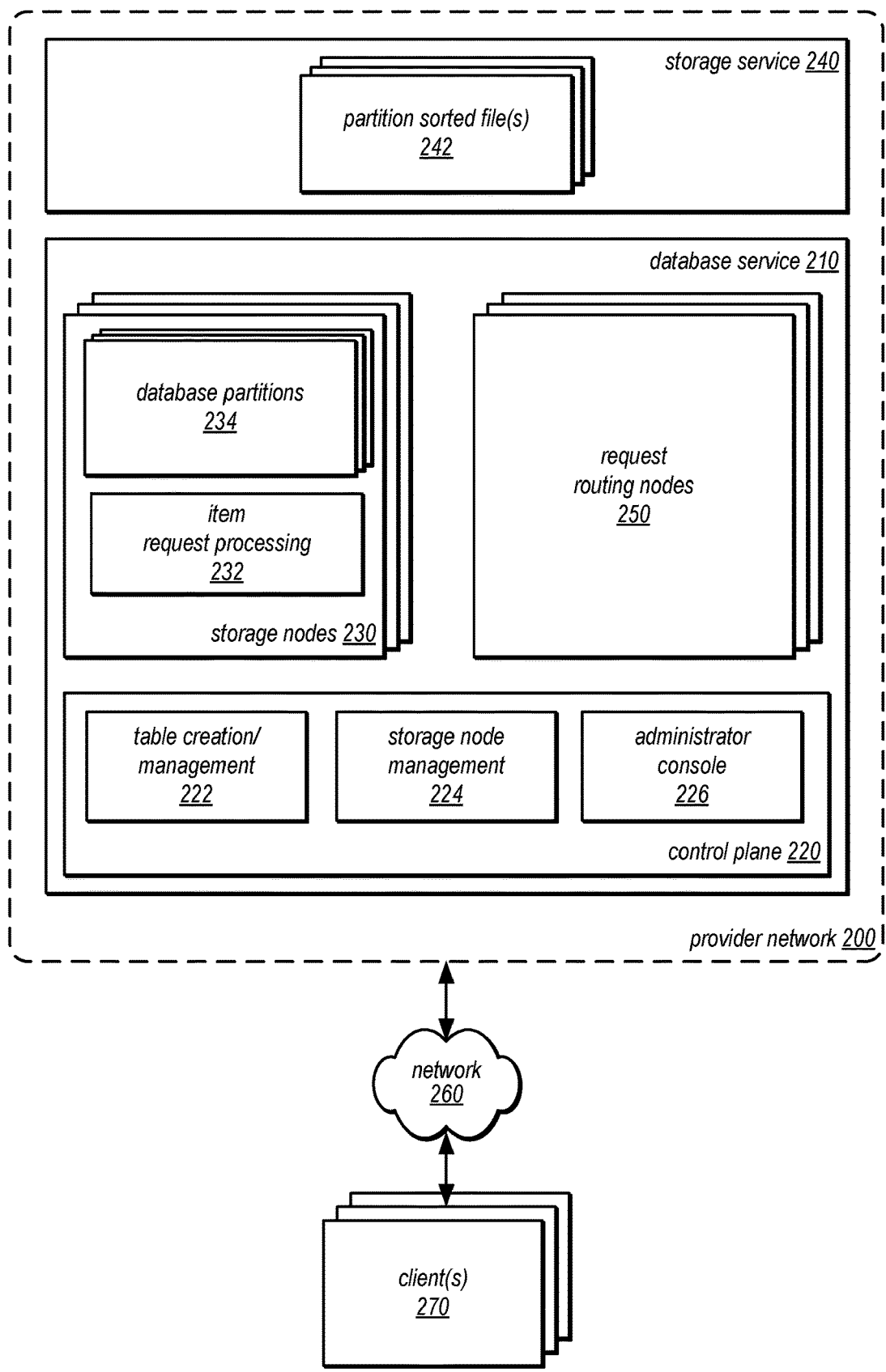
FIG. 2 is a logical block diagram illustrating a provider network offering a database service that may implement adaptive tiering for database data of a replica group, according to some embodiments.

FIG. 2 is a logical block diagram illustrating a provider network offering a database service that may implement adaptive tiering for database data of a replica group, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 10 and described below. In some embodiments, the functionality of a given system or service component (e.g., a component of key value database service 210) may be implemented by a particular node or may be distributed across several nodes. In some embodiments, a given node may implement the functionality of more than one service system component (e.g., more than one data store component).

Database service 210 may be implemented various types of distributed database services, in some embodiments, for storing and accessing data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data).

In some embodiments, clients 270 may encompass any type of client configurable to submit network-based requests to provider network 200 via network 260, including requests for database service 210 (e.g., to access item(s) in a table in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments.

In some embodiments, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Admin console 226 may allow system administrators to interact directly with database service 210 (and/or the underlying system). In some embodiments, the admin console 226 may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database key-value service 210. For instance, control plane 220 may communicate with processing nodes to initiate the performance of various control plane operations, such as moves of multi-table partitions, splits of multi-table partitions, update tables, delete tables, create indexes, etc. . . . In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosted in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Because tables may be stored in multi-table partitions, resource allocation for a table to be created may be avoided as multi-partition tables may be updated to handle additional data according to storage node management 224, or other partition management features, in some embodiments.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). Item request processing may include processing for sub-tables, as discussed below with regard to FIG. 4.

In some embodiments, database service 210 may provide functionality for creating, accessing, and/or managing tables or secondary indexes at nodes within a multi-tenant environment. For example, database partitions 234 may store table item(s) from multiple tables, indexes 238, or other data stored on behalf of different clients, applications, users, accounts or non-related entities, in some embodiments. Thus database partitions 234 may be multi-tenant, in some embodiments when storing items from different database tables. In some embodiments, an index may include table items 236 (e.g., in a B+ tree).

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage service) may have no predefined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition sorted files 242 for external storage replica group members as discussed below with regard to FIGS. 3 and 4. Storage service 240 may implement striping, sharding, or other data distribution techniques so that different portions of a file 242 are stored across multiple locations (e.g., at separate nodes) allowing for parallel reads to perform various operations such as read request handling and new replica creation, as discussed below with regard to FIGS. 3-6.

Figure 3:
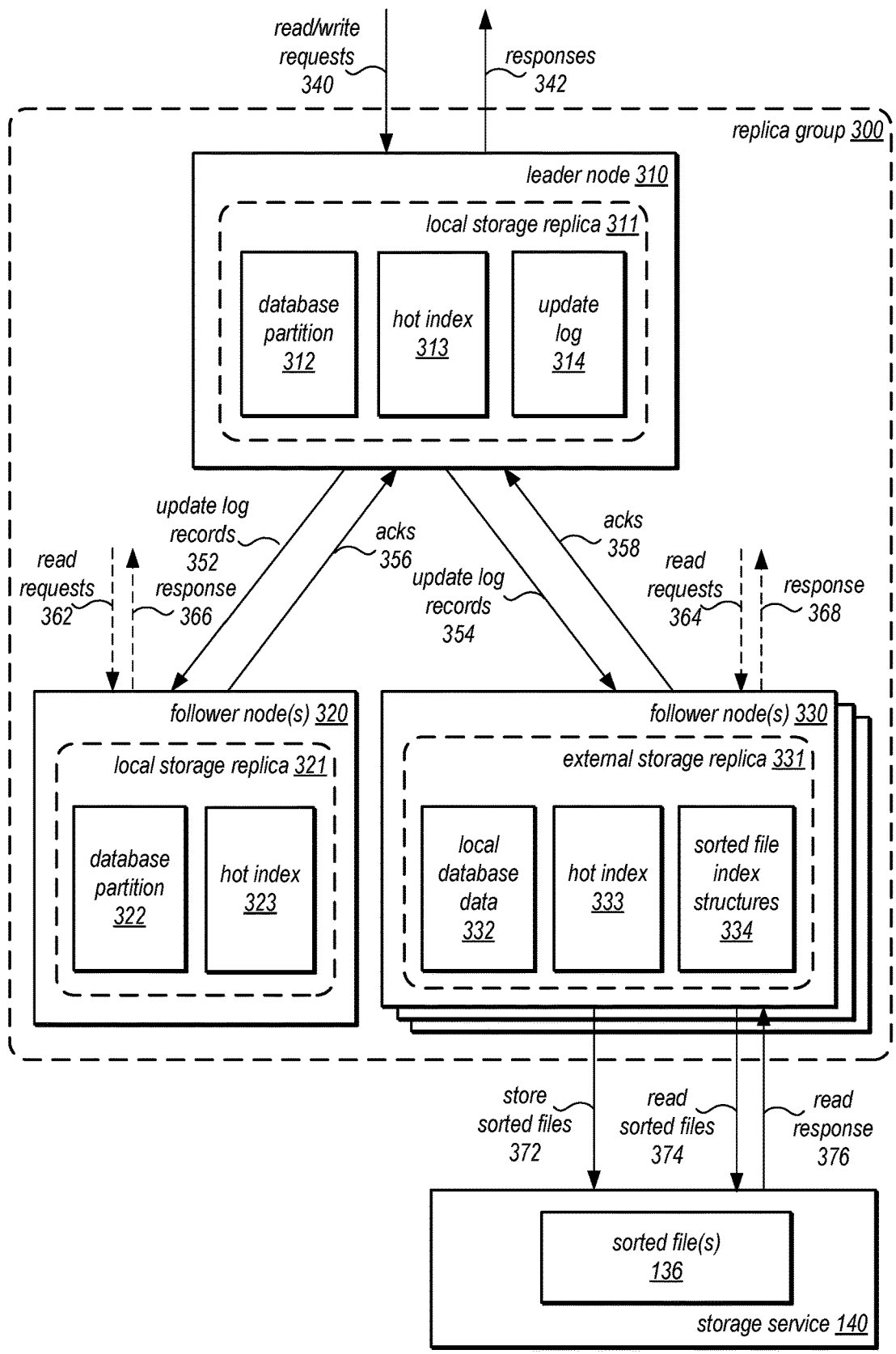
FIG. 3 is a logical block diagram illustrating a replica group for a database implementing different types of replicas with different types of index structures for storing database data, according to some embodiments.

FIG. 3 is a logical block diagram illustrating a replica group for a database implementing different types of replicas with different types of index structures for storing database data, in various embodiments. In some scenarios, replica group 300 may be only a single node (e.g., in failure modes, degraded modes, or different performance modes (not illustrated). Leader node 310 may accept both read and write requests 340 for the database and return responses 342 to those requests. In various embodiments, leader node 310 may store a database partition 312 to perform write requests and perform reads, as a local storage replica 311. The leader node may create an update log 314 to record updates made by write requests 340. In some embodiments, leader node 310 may also implement a hot index 313 identifying portions of database partition 312 which may be accessed more frequently or are more likely to be accessed than other portions of the database partition. In some embodiments, hot index 313 (and hot indexes 323 and 333 discussed below) may store the frequently accessed portions of a database (e.g., frequently accessed items) as separate copies of the portions in the hot index 313 structure (e.g., duplicates of the items may be stored as leaf nodes in a b-tree or other index structure while the items may also be stored in corresponding database partitions or as a sorted file in the storage service).

Leader node 310 may send information including update log records to follower nodes, such as follower node(s) 320 as indicated at 352 and follower node(s) 330, as indicated at 354. Different types of storage replicas may be implemented at different follower nodes. For example follower node(s) 320 may be a local storage replica 321, which may apply the updates to database partition 322. When updates are applied, follower node 356 may send an acknowledgement of the updates as shown in 356 and 358. In some embodiments, leader node 310 may send additional information to follower node(s) 320 and 330 indicating the portions of the database partition identified as hot in the hot index 313. Using this additional information, follower nodes 320 and 330 may also implement respective hot indexes 323 and 333 identifying respective portions of database data 322 and 332 which may be accessed more frequently or are more likely to be accessed than other portions of the database partition.

Follower node(s) 330 may implement an external storage replica 331. As discussed above with regard to FIG. 1, external storage replicas may use a different type of index than local storage replicas (e.g. log-structured merge tree instead of a b-tree index). A first node of the follower node(s) 330, such as storage node 130a of FIG. 1, may receive update log records 354 and store database data in local database data 332. The first follower node may then, at a later time, store database data 372 as sorted files 136 in storage system 140, when a size of update log records or a size of local database data is exceeded. Once stored in sorted files 136 in storage system 140, these records and files may be immutable in some embodiments. Once stored, in some embodiments follower nodes 330 may request immutable sorted files 136 from the storage service 140, as shown in 374, and receive read responses 376. In some embodiments, portions of database data may be retained in local database data 332 according to information maintained in hot index 333 identifying portions of database data 332 which may be accessed more frequently or are more likely to be accessed than other portions of the database partition.

In some embodiments, follower nodes may optionally perform read requests. For example read requests 362 and 364 may be received at follower node(s) 320 and 330 and read responses returned 366 and 368. Follower node(s) 330 may also create sorted file index structures 334, which may, in some embodiments, include probabilistic structures, such as bloom filters or skip lists, or other non-probabilistic structures to determine which sorted files to read when storing sorted files 136. Thus follower node(s) 330 may access the sorted file index structures 334 to determine which sorted files to read to return a response, as discussed below with regard to FIG. 7. As also discussed below with regard to FIG. 7, in some embodiments, local database data 332 may also store hot (e.g., frequently accessed) items so that they may be cached in memory to answer read requests. In some embodiments, other types of caching strategies, such as cold caches for point queries, may be implemented in addition to or instead of hot data caches. Follower node(s) 320 may also receive read requests and may return a response using database partition 322.

In some embodiments, leader node 310 may truncate or remove old log records from update log 314 when acknowledged (e.g., 356 and 358) by follower nodes. In some embodiments, a first follower node 330, such as storage node 130a of FIG. 1, may not acknowledge 358 until the log records are stored as sorted files 372.

Figure 4:
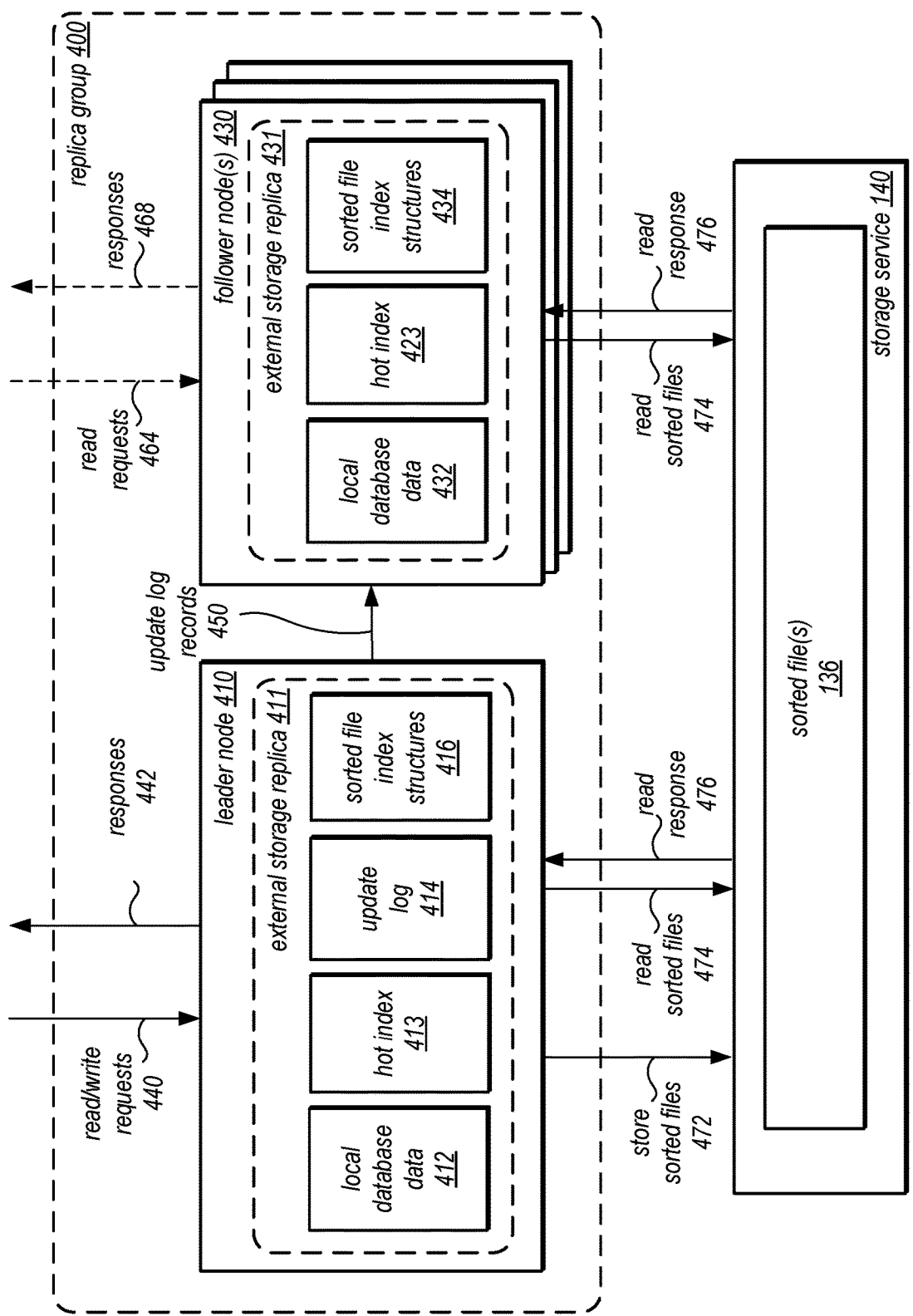
FIG. 4 is a logical block diagram illustrating a replica group for a database with a leader node storing portions of a database in external storage, according to some embodiments.

FIG. 4 is a logical block diagram illustrating a replica group for a database comprising a leader node storing portions of a database in external storage, in various embodiments. In some scenarios, replica group 400 may be only a single node (e.g., in failure modes, degraded modes, or different performance modes (not illustrated). Leader node 410 may accept both read and write requests 440 for the database and return responses 442 to those requests. In various embodiments, leader node 410 may store a local database data 412 to perform write requests and perform reads, as an external storage replica 411. The leader node 410 may create an update log 414 to record updates made by write requests 440, as described above in FIG. 3. The leader node 410 may then store database data 472 as sorted files 136 in storage system 140, when a size of update log records or a size of local database data is exceeded. Once stored in sorted files 136 in storage system 140, these records and files may be immutable in some embodiments. Once stored, in some embodiments leader node 410 and follower nodes 430 may request immutable sorted files 136 from the storage service 140, as shown in 474, and receive read responses 476.

In some embodiments, leader node 410 may also implement a hot index 413 identifying portions of database partition 412 which may be accessed more frequently or are more likely to be accessed than other portions of the database partition (or storing respective copies of the portions of the database as part of the host index 413 structure, similar to the discussion above with regard to FIG. 3). Leader node 410 may send information including update log records to follower nodes 430 as indicated at 450. In some embodiments, leader node 410 may send additional information to follower nodes 430 indicating the portions of the database partition identified as hot in the hot index 413. Using this additional information, follower nodes 430 may also implement respective hot indexes 423 identifying respective portions of database data 432 which may be accessed more frequently or are more likely to be accessed than other portions of the database partition.

In some embodiments, follower nodes may optionally perform read requests. For example read requests 464 may be received at follower node(s) 430. Follower node(s) 430 may also create sorted file index structures 434, which may, in some embodiments, include probabilistic structures, such as bloom filters or skip lists, or other non-probabilistic structures to determine which sorted files to read when storing sorted files 136. Thus follower node(s) 430 may access the sorted file index structures 434 to determine which sorted files to read to return a response, as discussed below with regard to FIG. 7. As also discussed below with regard to FIG. 7, in some embodiments, local database data 432 may also store hot (e.g., frequently accessed) items so that they may be cached in memory to answer read requests. In some embodiments, other types of caching strategies, such as cold caches for point queries, may be implemented in addition to or instead of hot data caches. Follower node(s) 420 may also receive read requests and may return a response using database partition 422.

Figure 5A:
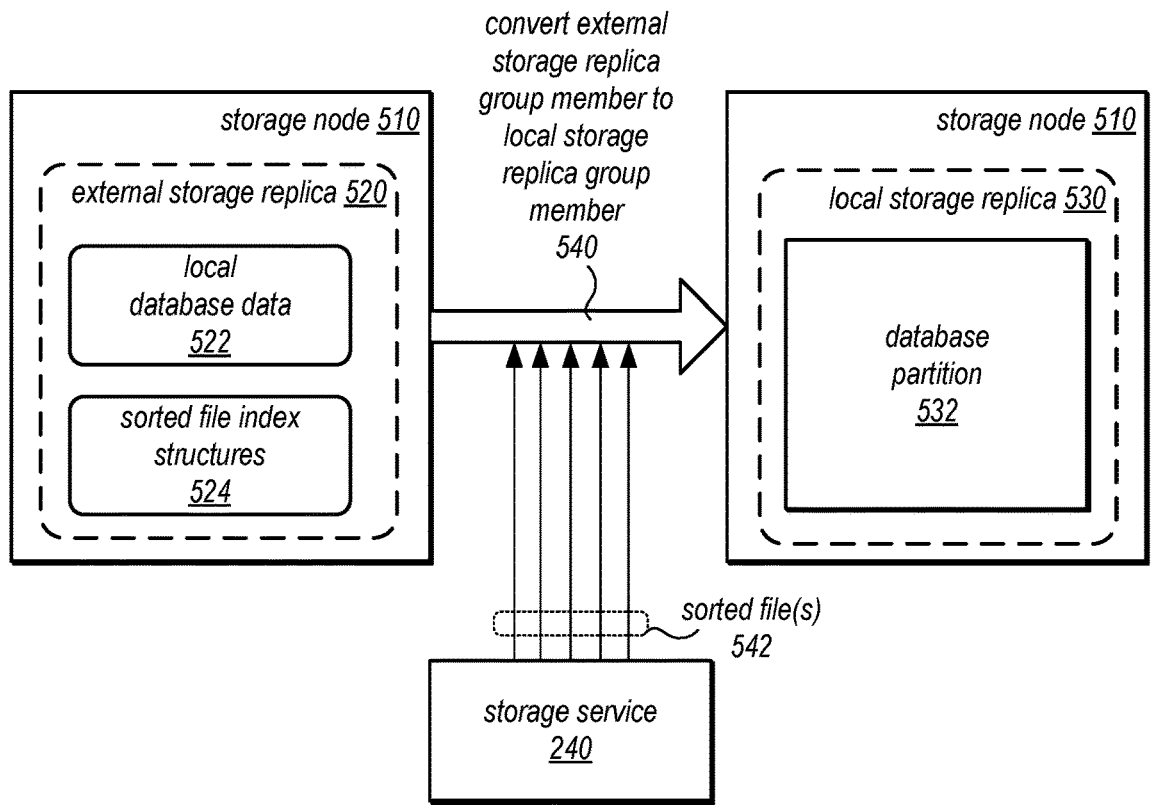
FIG. 5A illustrates an example conversion from one type of storage replica to another, according to some embodiments.

FIG. 5A illustrates an example conversion from one type of storage replica to another, according to some embodiments. Storage node 510 may be an external storage replica 520 for a replica group of a database. Local database data 522 may be stored (e.g., hot data cache and an ordered tree for storing update log records) and sorted file index structures 524 (e.g., a bloom filter, skip list, log structured merge tree, etc.). The storage node 510 may be identified for conversion 540 to a local storage replica in the replica group. For example, sorted file(s) 542 may be obtained from storage service 240 and used to create database partition 532 at storage node 510 to use for performing updates and read requests as a local storage replica 530.

Figure 5B:
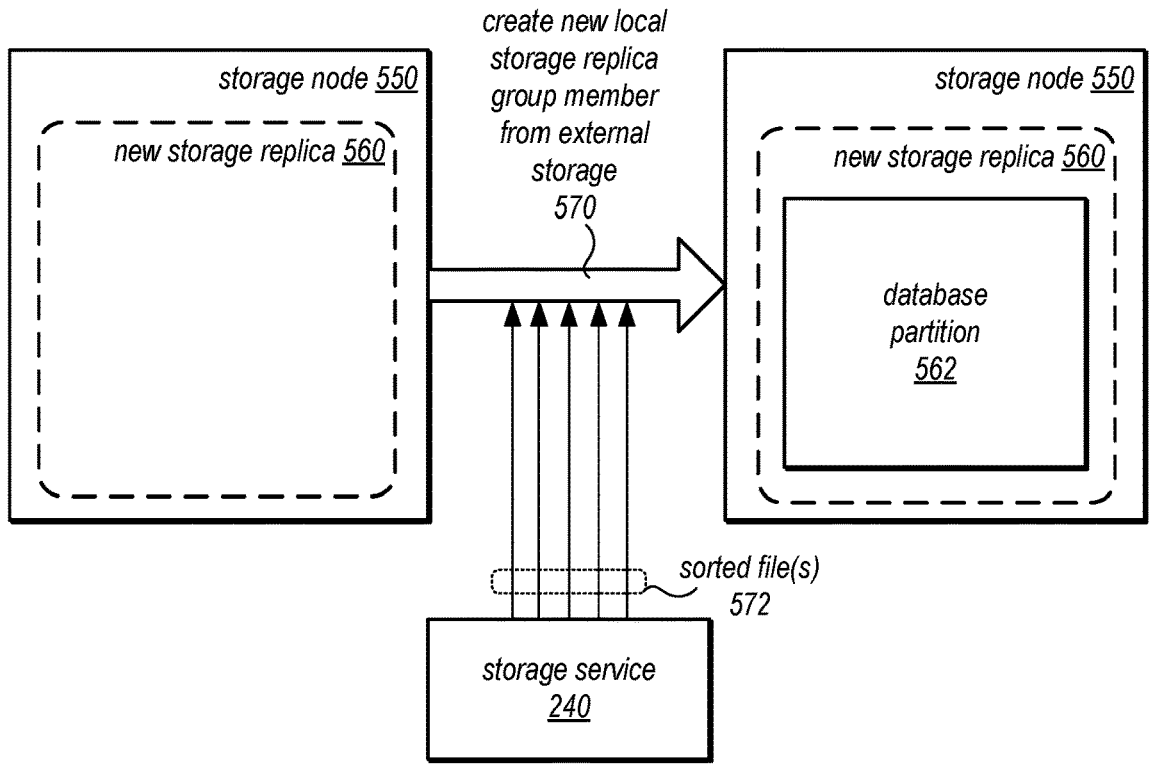
FIG. 5B illustrates an example creation of a new local storage replica from external storage, according to some embodiments.

FIG. 5B illustrates an example creation of a new local storage replica from external storage, according to some embodiments. Similar to the discussion above with regard to FIG. 4, a new storage node 550 may be identified for new storage replica 560. A new local storage replica group member may be created from external storage, as indicated at 570. As illustrated, sorted file(s) 572 may be obtained from storage service 240 and used to create database partition 562 at storage node 550 to use for performing updates and read requests as a local storage replica 560.

Figure 6:
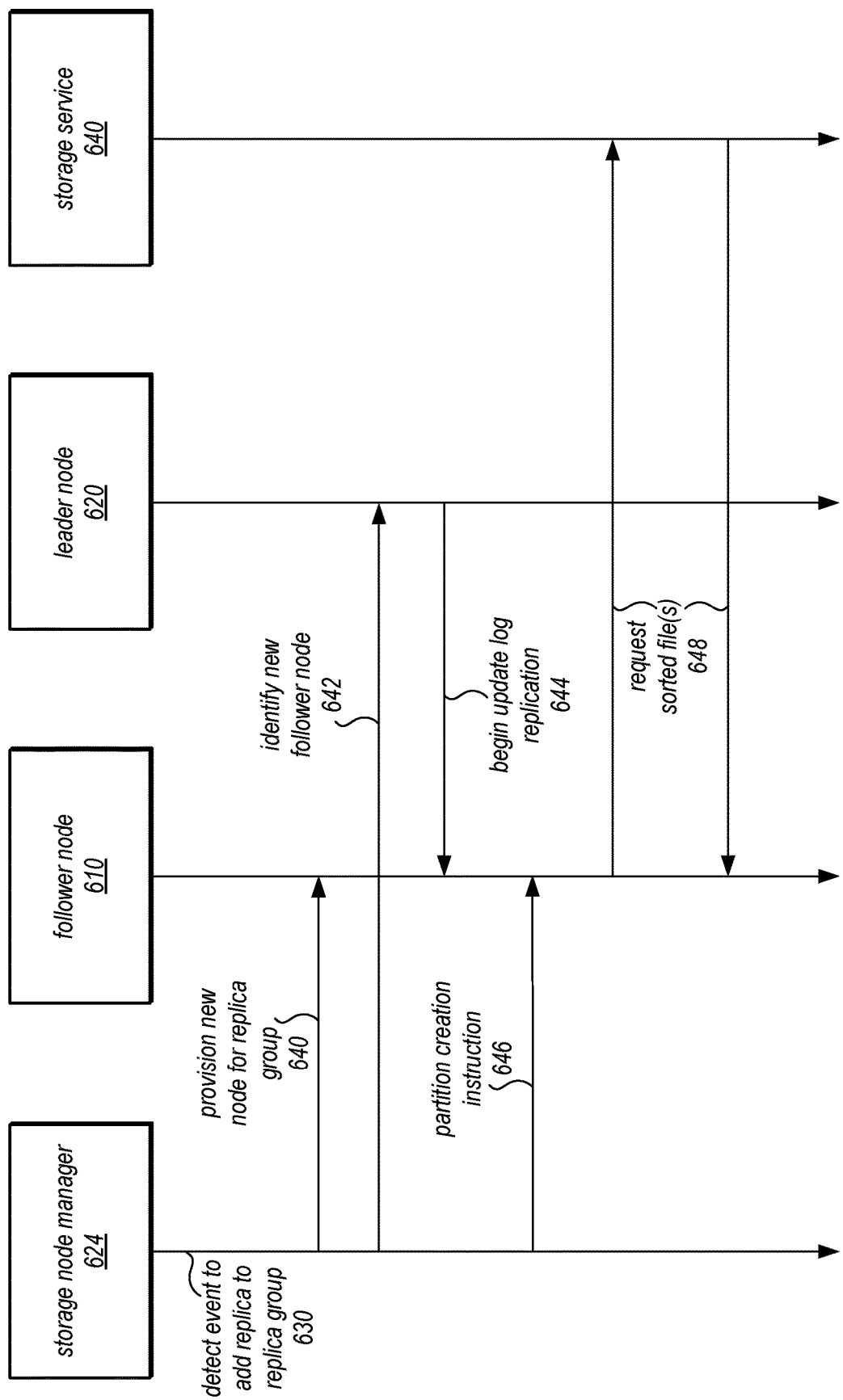
FIG. 6 is a logical block diagram illustrating interactions to add a replica to a replica group, according to some embodiments.

FIG. 6 is a logical block diagram illustrating interactions to add a replica to a replica group, according to some embodiments. As indicated at 630, storage node manager 624 may detect an event to add a replica to a replica group, in some embodiments. Storage node manager 624 may send or otherwise provision 640 a new node for the replica group to be a new follower node 610. Storage node manager 624 may send a request 642 to leader node 620 for the replica group to identify follower node 610 as part of the replica group, in some embodiments. In some embodiments, follower node 610 may register or communicate membership directly with leader node 620 (not illustrated). As indicated at 644, leader node 640 may begin update log replica to follower node 610.

As indicated at 624, storage node manager 624 may send a partition creation instruction 646 to follower node 610, which may identify the objects (e.g., files) to obtain to create the database partition at follower node 610, in some embodiments. As indicated at 648, follower node 610 may then perform requests to obtain sorted files from storage service 640 in order to create the database partition at follower node 610, in some embodiments. New replicas may be created in different types of formats. For example, although a follower node may store a local storage replica, the file type or other data format of the local storage replica for follower node 610 may different than the local storage replica formats at other follower nodes (e.g., data formatted for a different type of storage engine), in some embodiments. In this way, additional replicas may be created in a replica group to serve requests for different types of requests (or supported more efficiently) by data stored in the different format.

The examples of a database that implements different types of index structures for storing database data in a replica group as discussed in FIGS. 2-6 above have been given in regard to a database service (e.g., a relational database, non-relational, or other type of database service). However, various other types of database systems that can advantageously implement a replica group may implement different types of index structures for storing database data in a replica group, in other embodiments.

Figure 7:
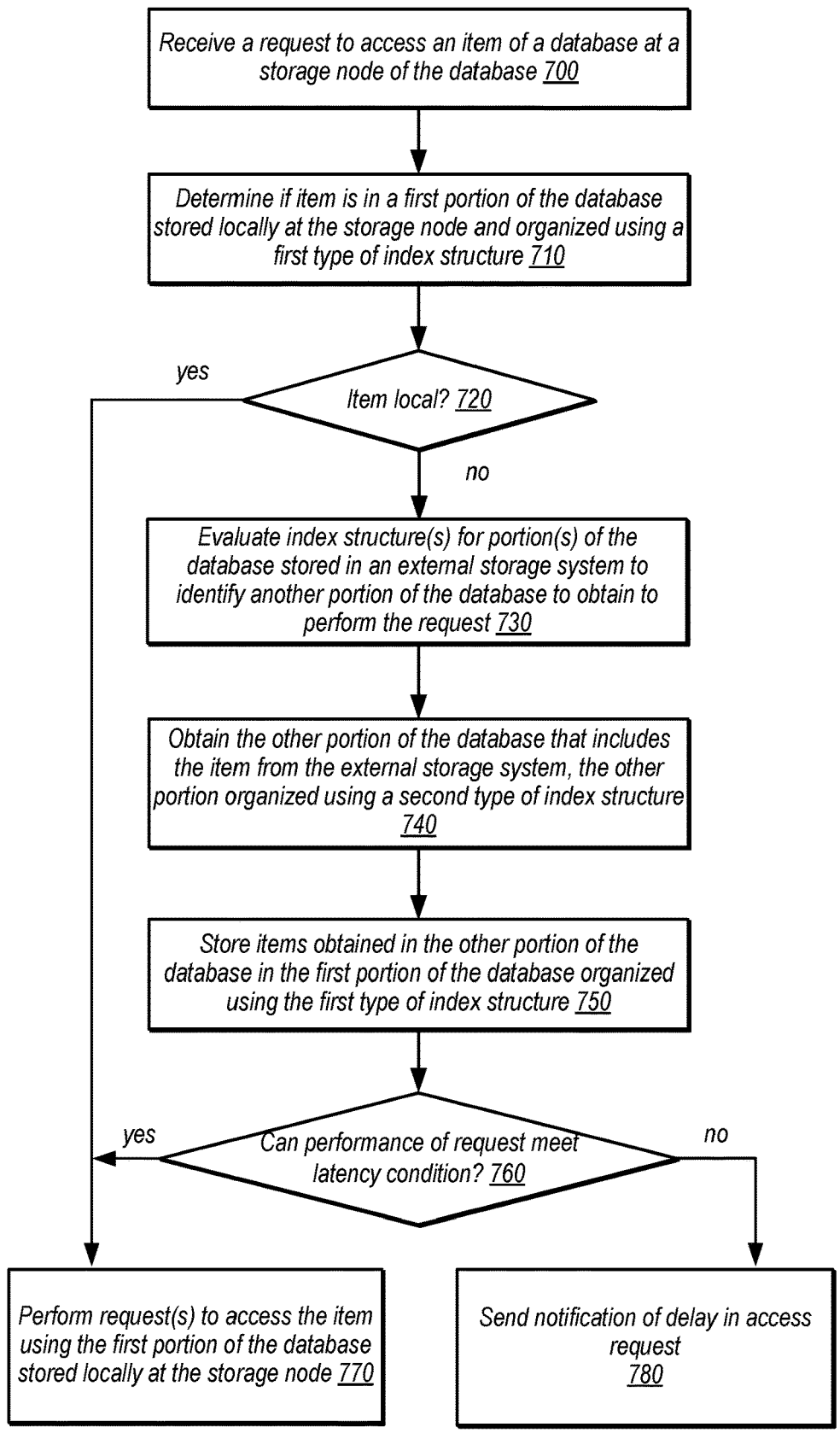
FIG. 7 is a high-level flowchart illustrating various methods and techniques for a storage node of a replica group to obtain a portion of a database replica from external storage when adaptive tiering of database data is implemented, according to some embodiments.

FIG. 7 is a high-level flowchart illustrating various methods and techniques for a storage node of a replica group to obtain a portion of a database replica from external storage, according to some embodiments. These techniques, as well as the techniques discussed with regard to FIGS. 8-9, may be implemented using components or systems as described above with regard to FIGS. 2-6, as well as other types of databases or storage services, and thus the following discussion is not intended to be limiting as to the other types of systems that may implement the described techniques.

As indicated at 700, a request to perform an access to an item in a database may be received at a storage node (e.g., storage node 130 of FIG. 1) of a replica group, in some embodiments. For instance, as discussed above with regard to FIGS. 1-6, a replica group may be a replica group that maintains a partition of a larger database (which may include other partitions).

As indicated at 710, responsive to receiving the request, the storage node may first determine if the item to be accessed resides within a first portion of the database, such as the local database data 132 of FIG. 1. This first portion of the database may be organized using any suitable indexing structure such as log-structured merge trees or balanced trees. If the item is found to be included in the first portion of the database, as shown in 720, the process may proceed to step 770.

If, however, the item is not included in the first portion of the database, as shown in 720, the process may proceed to step 730 where index structures for other portions of the database may be evaluated to identify another portion of the database which includes the item. Examples of such index structures are the sorted file index structures 134 of FIG. 1.

Once a portion including the item is identified, the process proceeds to step 740 where the storage node may obtain the identified portion of the database, the portion including a plurality of items of the database including the item to be accessed. This portion of the database may be, for example, a sorted file 136 of FIG. 1 and may be obtained from an external storage service such as storage system 140 of FIG. 1. This obtained portion of the database may be organized using any indexing structure suitable for storing the portion of the database at the external storage service and may be included, for example, as part of the sorted file 136 of FIG. 1, in various embodiments.

Once the identified portion of the database has been obtained, as indicated in 750 the storage node may store the plurality of obtained items of the database in the local database data organized using the indexing structure of the local database data. In some embodiments, the additional steps 710-750 may result in the access of the item being unable to meet an access latency condition or guarantee of the database. In the event the access latency condition may be met, the process advances to step 770. Otherwise, as indicated in 780, a notification of delay in accessing the item may be sent, in some embodiments. This notification may result, in various embodiments, in one or more requests to retry the access of the item of the database. In such embodiments, future retries of the access may result in the latency condition being satisfied.

As indicated in 700, once the item to be access is stored in the first portion of the database, the request to access the item may be performed using the first portion of the database stored locally at the storage node, in various embodiments.

Figure 8:
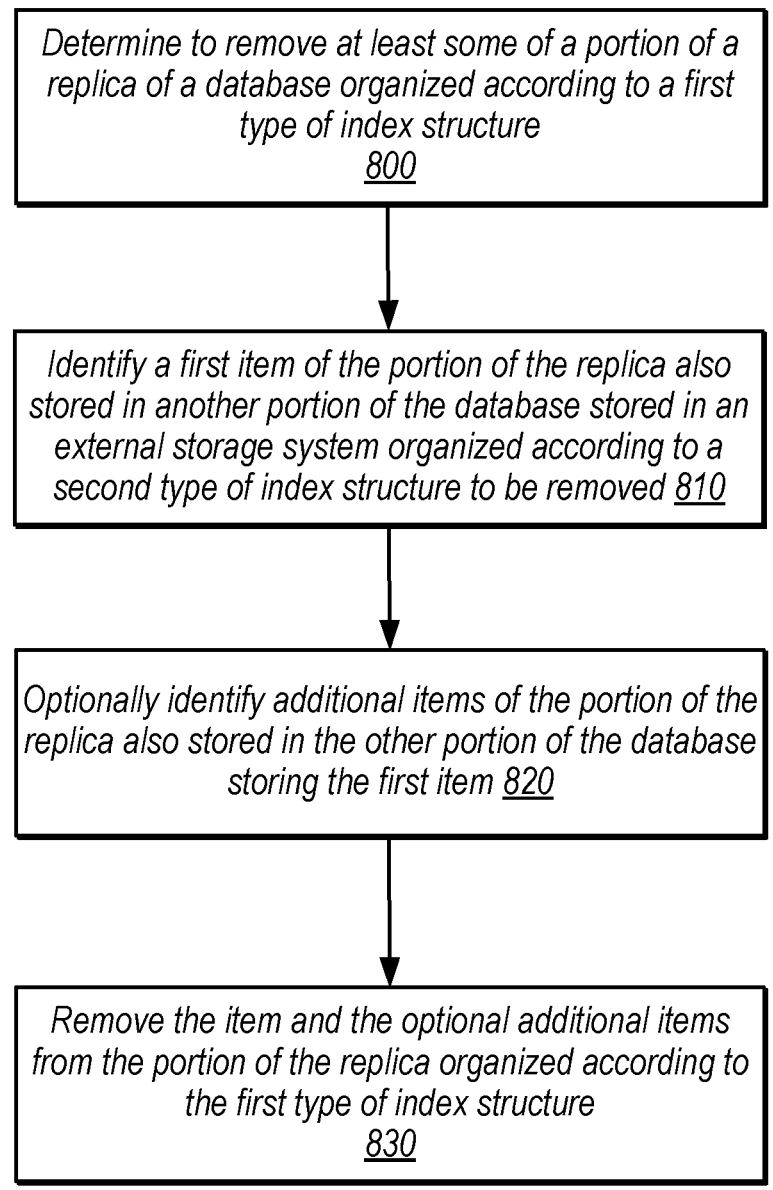
FIG. 8 is a high-level flowchart illustrating various methods and techniques remove a portion of a database replica already stored in external storage from a storage node of a replica group, according to some embodiments.

FIG. 8 is a high-level flowchart illustrating various methods and techniques remove a portion of database data already stored in external storage from a storage node of a replica group, according to some embodiments. As indicated in 800, the technique begins by determining to remove at least some items from a portion of a database stored locally at a storage node, such as in local database data 132 of FIG. 1. This determination may be made for any number of reasons. For example, a determination could be made responsive to the portion of the database stored locally exceeding a predetermined size. In another example, a determination could be made based on temporal considerations or based on client input. Any number of reasons may be envisioned and the above examples are not intended to be limiting.

As shown in 810, responsive to the determination a storage node may identify an item included in both the portion of the database stored locally at the storage node, such as in local database data 132 of FIG. 1, and in an immutable portion of the database stored at an external storage service, such as in a sorted file 136 in storage service 140 of FIG. 1. This determination may be made for any number of reasons in various embodiments. For example, the plurality of items may be identified based on a least recent access time. In another example, the plurality of items may be identified based on client input. Any number of reasons may be envisioned and the above examples are not intended to be limiting. The plurality of identified items may further include all items included within the immutable portion of the database stored at an external storage service in some embodiments.

Once an item has been identified, as indicated in 820, in some embodiments additional items stored in the same immutable portion of the database storing the identified item may also be identified for removal. The additional items may include a portion or all of the items stored in the immutable portion of the database, in various embodiments.

Once all items has been identified, as indicated in 830, the identified items may then be removed from the portion of the database stored locally at the storage node. As items may be immutable, in some embodiments, once stored at the external storage service, an update of the portion of the database stored at an external storage service may be avoided prior to removal of the items from the portion of the database stored locally at the storage node.

Figure 9:
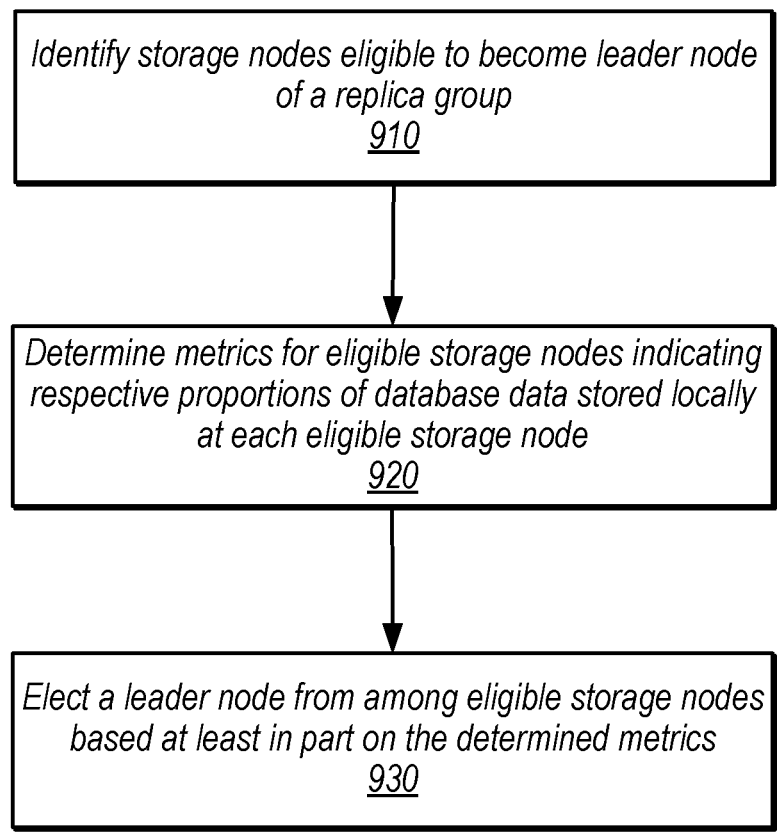
FIG. 9 is a high-level flowchart illustrating various methods and techniques to elect a leader node of a replica group that implements adaptive tiering of database data for a replica group, according to some embodiments.

FIG. 9 is a high-level flowchart illustrating various methods and techniques to elect a leader node of a replica group, according to some embodiments. A replica group may elect a leader node for a number of reasons in various embodiments. For example, storage node management 224 may detect storage node failures, or provide other anomaly control, in some embodiments. If the partition replica hosted on the storage node on which a fault or failure was detected was the master for its replica group, a new leader may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault. Any number of reasons may be envisioned and the above examples are not intended to be limiting.

The technique begins by identifying storage nodes eligible to become leader node of the replica group, as shown in 910. In some embodiments, eligible storage nodes may include all remaining storage nodes in the replica group while in other embodiments some remaining storage nodes in the replica group may be excluded for a number of reasons. Such reasons may include geographic locations, as an example. Any number of reasons may be envisioned and the above examples are not intended to be limiting.

Once eligible storage nodes have been determined, a metric for each eligible storage node may be determined, as shown in 920, in various embodiments. The metrics provide indications of the fraction of the total database replica for the storage node that is contained within the portion of the database stored locally at the respective storage node. For example, one eligible storage node may include the entire database within the portion of the database stored locally may, therefore, have a determined metric of one hundred percent, or an equivalent metric thereof, while another eligible storage node may include only a small portion of entire database within the portion of the database stored locally may, therefore, have a determined metric of, for example, ten percent. Such examples are merely illustrative and any suitable metric indicating the relative proportion of database data stored locally at the storage node may be used.

Once metrics for each eligible storage node have been determined, a leader node may be elected from among the eligible storage nodes based at least in part on the determined metrics, as shown in 930. Such election may occur in a number of ways in various embodiments. For example, in some embodiments, election may be performed by a central storage node authority, such as within storage node management 224 of control plane 220 as shown in FIG. 2, using the collective metrics of all eligible storage nodes. In other embodiments, an election may occur in a distributed fashion, for example, from among all eligible or remaining storage nodes of a replica group, where a determined metric for an eligible storage node may bias its consideration as leader node. Any number of election techniques may be envisioned and the above examples are not intended to be limiting.

In some embodiments, a newly elected leader node may transition from implementing an external storage replica to a local storage replica, such as shown in FIGS. 3 and 5A. Such a transition may be performed by obtaining, from the external storage service, a plurality of portions of the database, such as sorted file(s) 542 from storage service 240 as shown in FIG. 5A, each comprising respective pluralities of items and each organized as a file and storing the respective pluralities of items of the plurality of portions of the database in the portion of the database organized according to the tree structure, such as the local storage replica 530 as shown in FIG. 5A.

The methods described herein may in various embodiments be implemented by any combination of hardware and software. For example, in some embodiments, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various items may be added, reordered, combined, omitted, modified, etc.

Figure 10:
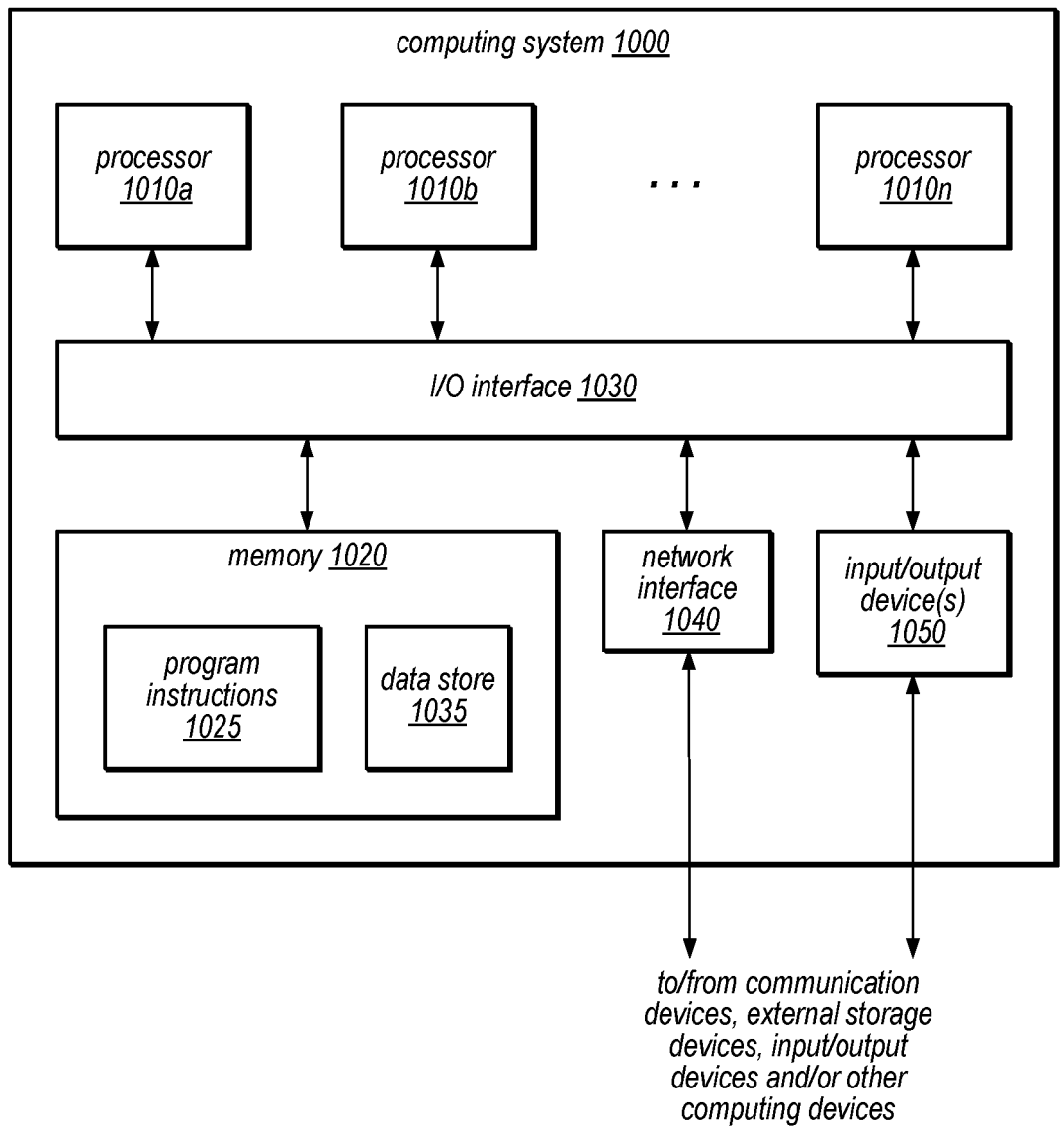
FIG. 10 is a block diagram illustrating an example computing system, according to some embodiments.

Embodiments to implement different types of index structures for storing database data in a replica group as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some items may be implemented via one or more nodes of computer system 1000 that are distinct from those nodes implementing other items.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement different types of index structures for storing database data in a replica group, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in some embodiments. In some embodiments, program instructions 1025 may include software items of embodiments as described herein and as illustrated in the Figures. Data storage 1035 may include data that may be used in embodiments. In other embodiments, other or different software items and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various items may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed cause the at least one processor to implement a storage node of a replica group configured to:
   receive a request to access an item of a database;
   responsive to receiving the request:
       determine that the item of the database is not in a portion of the database maintained at the storage node and organized according to a tree structure;
       obtain, from an external storage service, another portion of the database organized as a file and comprising a plurality of items including the item, wherein the file organization of the other portion of the database is different from the tree structure organization of the portion of the database; and
       store the plurality of items of the other portion of the database in the portion of the database organized according to the tree structure; and
   process the request to access the item of the database according to the portion of the database.

2. The system of claim 1, further comprising:
   a control plane configured to:
   identify a leader node of the replica group, wherein to identify the leader node of the replica group the control plane is configured to:
       determine, for individual ones of a plurality of storage nodes of the replica group, respective metrics comprising respective fractions of the database residing in respective replicas of the respective storage nodes organized according to the first type of index structure; and
       elect one of the plurality of storage nodes as the leader node based at least in part on the respective metrics.

3. The system of claim 1, the storage node of the replica group further configured to:
   identify, prior to obtaining the other portion of the database, the other portion of the database as comprising the item according to a probabilistic data structure.

4. The system of claim 1, the storage node of the replica group further configured to:
   responsive to determining to remove at least some of the portion of the database organized according to the tree structure:
       identify the plurality of items of the other portion of the database stored in the portion of the database organized according to the first type of index structure; and
       remove the plurality of items from the portion of the database organized according to the first type of index structure;
   wherein the determining is based at least on part on one or more of:
       a data structure identifying a plurality of hot items to retain at the storage node;
       a last accessed time of at least some of the portion of the database; or
       input from a client of the database received via a programmatic interface.

5. A method, comprising:
   receiving at a storage node of a replica group a request to access an item of a database;
   responsive to receiving the request:
       determining that the item of the database is not in a portion of the database maintained at the storage node and organized according to a first type of index structure;
       obtaining, from an external storage service, another portion of the database comprising a plurality of items including the item and organized according to a second type of index structure different from the first type of index structure; and
       storing the plurality of items of the other portion of the database in the portion of the database organized according to the first type of index structure; and
   processing the request to access the item of the database according to the portion of the database.

6. The method of claim 5,
   wherein the first type of index structure is a tree structure;
   wherein the other portion of the database is stored as a file according to a second type of index structure.

7. The method of claim 5, further comprising:
sending, responsive to determining that the item of the database is not in the portion of the database organized according to a first type of index structure, an indication that the access cannot be performed within a latency constraint; and
receiving at the storage node a request to retry the access of the item of the database;
wherein the processing the request to access the item is performed responsive to receiving the request to retry the access of the item of the database.

8. The method of claim 5, further comprising:
identifying a leader node of the replica group, comprising:
determining, for individual ones of a plurality of storage nodes of the replica group, respective metrics comprising respective fractions of the database residing in respective replicas of the respective storage nodes organized according to the first type of index structure; and
electing one of the plurality of storage nodes as the leader node based at least in part on the respective metrics.

9. The method of claim 5, further comprising:
identifying, prior to obtaining the other portion of the database, the other portion of the database as comprising the item according to a probabilistic data structure.

10. The method of claim 5, further comprising:
responsive to determining to remove at least some of the portion of the database organized according to the first type of index structure:
identifying the plurality of items of the other portion of the database stored in the portion of the database organized according to the first type of index structure; and
removing the plurality of items from the portion of the database organized according to the first type of index structure.

11. The method of claim 10, wherein the determining is based at least on part on one or more of:
a data structure identifying a plurality of hot items to retain at the storage node;
a last accessed time of at least some of the portion of the database; or
input from a client of the database received via a programmatic interface.

12. The method of claim 5, wherein the database system is a non-relational database service offered by a provider network, wherein the external storage service is a storage service offered by the provider network, and wherein the other portion of the database is stored as a file in the storage service.

13. One or more non-transitory, computer-readable storage media, storing program instructions that when executed on or across one or more computing devices cause the one or more computing devices to implement a storage node of a replica group that implements:
receiving at a storage node of a replica group a request to access an item of a database;
responsive to receiving the request:
determining that the item of the database does not reside within a portion of the database maintained at the storage node and organized according to a tree structure;
obtaining, from an external storage service, another portion of the database comprising a plurality of items including the item and organized as a file; and
storing the plurality of items of the other portion of the database in the portion of the database organized according to the tree structure; and
processing the request to access the item of the database according to the portion of the database.

14. The one or more non-transitory, computer-readable storage media of claim 13, wherein the storage node of the replica group further implements:
sending, responsive to determining that the item of the database is not in the portion of the database organized according to a tree structure, an indication that the access cannot be performed within a latency constraint; and
receiving at the storage node a request to retry the access of the item of the database;
wherein the processing the request to access the item is performed responsive to receiving the request to retry the access of the item of the database.

15. The one or more non-transitory, computer-readable storage media of claim 13, wherein the storage node of the replica group further implements:
determining a metric comprising a fraction of the database residing in the portion of the database organized according to the tree structure; and
requesting assignment as a leader node of the replica group based at least in part on the determined metric.

16. The one or more non-transitory, computer-readable storage media of claim 15, wherein the storage node of the replica group further implements:
responsive to assignment as leader node of the replica group:
obtaining, from the external storage service, a plurality of portions of the database each comprising respective pluralities of items and each organized as a file; and
storing the respective pluralities of items of the plurality of portions of the database in the portion of the database organized according to the tree structure.

17. The one or more non-transitory, computer-readable storage media of claim 13, wherein the storage node of the replica group further implements:
identifying, prior to obtaining the other portion of the database, the other portion of the database as comprising the item according to a probabilistic data structure.

18. The one or more non-transitory, computer-readable storage media of claim 13, wherein the storage node of the replica group further implements:
responsive to determining to remove at least some of the portion of the database organized according to the tree structure:
identifying the plurality of items of the other portion of the database stored in the portion of the database organized according to the tree structure; and
removing the plurality of items from the portion of the database organized according to the tree structure.

19. The one or more non-transitory, computer-readable storage media claim 18, wherein the determining is based at least on part on one or more of:
a last accessed time of at least some of the portion of the database; or
input from a client of the database received via a programmatic interface.

20. The one or more non-transitory, computer-readable storage media of claim 13, wherein the database system is a non-relational database service offered by a provider network, wherein the external storage service is a storage service offered by the provider network, and wherein the other portion of the database is stored as a file in the storage service.

\* \* \* \* \*